L. C. SOMMER.
COMB.
APPLICATION FILED MAR. 9, 1915.

1,173,053.

Patented Feb. 22, 1916.

Witnesses

Inventor
L. C. Sommer,
By Victor J. Evans
Attorney

UNITED STATES PATENT OFFICE.

LOUIS C. SOMMER, OF JERSEY CITY, NEW JERSEY.

COMB.

1,173,053.      Specification of Letters Patent.      Patented Feb. 22, 1916.

Application filed March 9, 1915. Serial No. 13,194.

*To all whom it may concern:*

Be it known that I, LOUIS C. SOMMER, a citizen of the United States, residing at Jersey City, in the county of Hudson and State of New Jersey, have invented new and useful Improvements in Combs, of which the following is a specification.

This invention relates to combs and has for its object the provision of a simple and efficient device of this character which can be readily cleaned and have the teeth thereof replaced when broken.

Further objects of the invention will appear as the following description is read in connection with the accompanying drawing, which forms a part of this application, and in which:—

Figure 1:
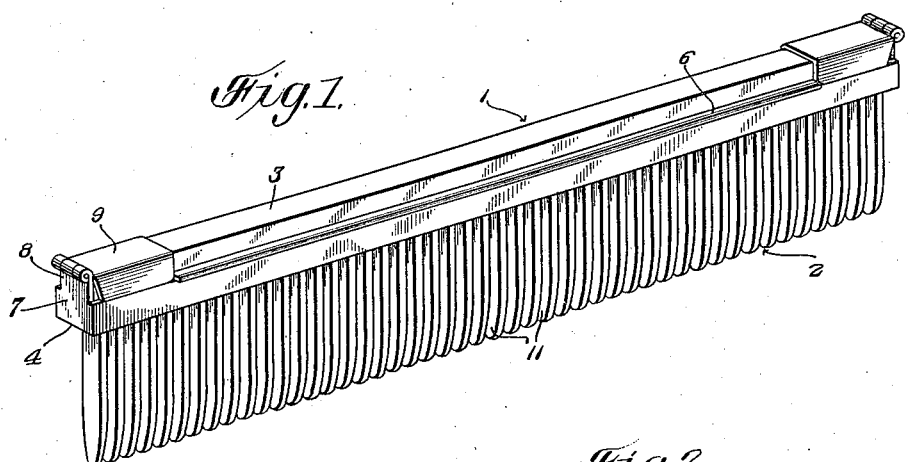
Figure 2:
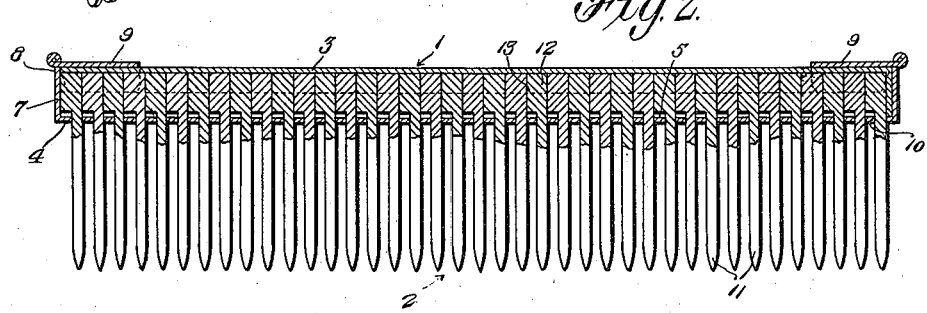
Figure 3:
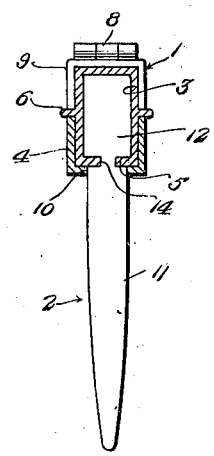
Figure 4:
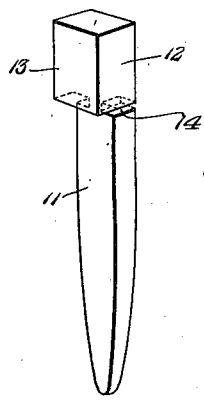

Figure 1 is a perspective view. Fig. 2 is a detail longitudinal sectional view. Fig. 3 is a transverse sectional view. Fig. 4 is a detail perspective view of one of the teeth.

Referring more particularly to the drawing, 1 represents the back of the comb and 2 the teeth thereof. The back 1 comprises two separate parts 3 and 4, the first of which consists of a channel member having at its edges the inwardly turned flanges 5 for a purpose to be hereinafter described. One end of the channel member 3 is closed and throughout a portion of its length there is formed upon opposite sides thereof the longitudinal ribs 6 arranged to limit the movement of the member 3 into the member 4. The member 4 comprises a channel member having both ends closed as shown at 7 and attached thereto a hinge element 8 which carries a locking clip 9 arranged to fit tightly over the member 3 and hold the same in place in the member 4. The bottom wall of the channel member 4 is provided with a plurality of closely arranged slots 10 adapted to receive the teeth 2, as will be more readily understood hereinafter.

The teeth comprise an elongated and pointed body 11 and a head 12 thickened on the outside, as shown at 13, so as to properly space the bodies of adjoining teeth and is also provided with notches 14 to receive the flanges 5. The channel member 3 is closely packed with the teeth 2, the thickened portion 13 of each head thereof abutting against the flat side of the adjoining teeth, as will be readily seen from an inspection of Fig. 2. The teeth are then inserted through the apertures or openings 10 and are thus further held in separated relation when the member 3 is pressed into the member 4. The clips are then turned upon the hinging points and clamped over the member 3, as shown in Fig. 1. By withdrawing the member 3 and the teeth carried thereby from the member 4 the dandruff, hair and other material collected upon the teeth will be scraped therefrom by the side walls of the slots 10. After the member 3 has been removed from the member 4 all of the teeth or any of them may be removed and replaced as desired.

What is claimed is:—

1. A comb comprising a back consisting of interengaged channel members, and teeth carried by one of the channel members and projecting through openings in the other channel member.

2. A comb comprising a back consisting of interengaged channel members, teeth removably carried in one of the channel members and projecting through openings in the other channel member, and means for holding the channel members in interengaged position.

3. A comb comprising a channel member having a plurality of teeth receiving apertures, a second channel member arranged to fit within the first channel member, teeth removably fitted in said second channel member and arranged to pass through the openings in the first channel member, and means for holding the second channel member within the first channel member.

4. A comb comprising a tooth holding member, teeth removably arranged therein, an apertured member for receiving the first member and permitting the passage of the teeth therethrough, said teeth closely fitting the walls of the apertures, and means for holding the first member within the second member.

5. A comb comprising a tooth holding member, teeth removably arranged therein, an apertured member for receiving the first member and permitting the passage of the teeth therethrough, said teeth closely fitting the walls of the apertures, means for holding the first member within the second member, and means for limiting the movement of the first member within the second member.

6. A comb comprising a substantially U-shaped member having a plurality of openings in the bottom thereof, a second substantially inverted U-shaped member removably fitted within the first mentioned member, longitudinally extending ribs on said inverted member for engagement with the parallel walls of the first member to limit the movement of the inverted member within the first mentioned member, means for holding the said members operatively associated, and a plurality of teeth positioned in the second mentioned member and projecting through said openings in the first mentioned member.

In testimony whereof I affix my signature in presence of two witnesses.

LOUIS C. SOMMER.

Witnesses:
PAUL C. GOTTSCHALCK,
CARL W. GOTTSCHALCK.